ALMERON McKENNEY.

Improvement in Devices for Locking Nuts.

No. 118,256.   Patented Aug. 22, 1871.

UNITED STATES PATENT OFFICE.

ALMERON McKENNEY, OF MAUMEE, OHIO.

IMPROVEMENT IN DEVICES FOR LOCKING NUTS.

Specification forming part of Letters Patent No. 118,256, dated August 22, 1871.

*To all whom it may concern:*

Be it known that I, ALMERON MCKENNEY, of Maumee, in the county of Lucas and in the State of Ohio, have invented certain new and useful Improvements in Nut-Locks; and I do hereby declare that the following is a full, clear, and exact description thereof, reference being had to the accompanying drawing and to the letters of reference marked thereon making a part of this specification.

The nature of my invention consists in a nut-locking device, as hereinafter more fully set forth.

Figure 1:
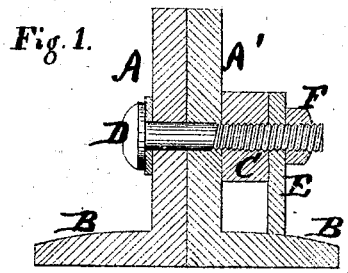
Figure 2:
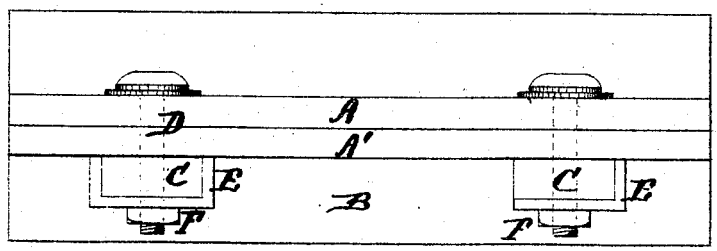
Figure 3:
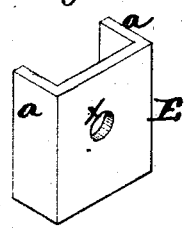

Figure 1 of the accompanying drawing represents a cross-section of a railroad rail made in two sections, and secured together by a bolt and my nut-locking device. Fig. 2 shows a plan view of the same; Fig. 3, a perspective view of one of the plates, which is placed on the outside of the nut, provided with two angles; and Fig. 4, a similar view of one of the plates having but one angle.

Similar letters of reference indicate like parts.

Figure 4:
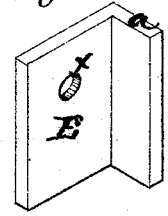

A A' represent a railroad rail made in two parts, each having a base, B. D represents an ordinary bolt, which is made somewhat longer than the thickness of the two parts to be bolted together. On the screw end of this bolt is the usual nut C, made either square or polygonal on its exterior surface. E represents a metallic plate provided with an orifice, X, through which the end of the bolt passes. This plate may have but one angle, *a*, as shown in Fig. 4, or it may have two, as shown in Fig. 3. After the nut C has been screwed on the bolt D I place either form of this metallic plate on its edge, so that its angle or angles will inclose the nut on two of its sides, and the main portion of the plate will be on the outer face of the nut. Upon the outside of this plate is then screwed a small nut, F, which secures the plate in position close against and upon one or both sides of the nut C. It will be understood that the plate with its two angles is made of a size equal to the size of the nut. Whether the plate has one or two angles, as herein shown, it is always made of a length to extend beneath the nut, with its lower edge resting on the base B, as shown in Fig. 1, or other suitable base, so that it cannot turn and allow the nut to work loose. I intend to roll either of these plates in long bars, so that they can be cut of a length to suit the base upon which their lower ends are to rest when used in locking nuts.

By means of the devices herein described I am enabled to form a simple and effective nut-lock, which can be used for various purposes, such as clamping the fish-pieces to railroad rails, or any other articles requiring to be secured together by a bolt.

I do not wish to be understood as broadly claiming a single or double angular metal bar or plate in nut-locks.

Having thus fully described my invention, what I claim as new, and desire to secure by Letters Patent, is—

The within-described nut-lock, consisting of the angular plate E, through which the bolt passes, and placed edgewise, with its lower edge resting on a base, B, and secured on the outer face and on one or two sides of the nut C by the nut F on the end of the bolt D, all substantially as and for the purposes herein set forth.

In testimony that I claim the foregoing I have hereunto set my hand this 17th day of July, 1871.

A. McKENNEY.

Witnesses:
C. L. EVERT,
A. N. MARR.